United States Patent [19]
Fujimoto et al.

[11] Patent Number: 5,240,400
[45] Date of Patent: Aug. 31, 1993

[54] SCREW-TYPE EXTRUSION GRANULATING APPARATUS, ESPECIALLY FOR PRODUCING VERY FINE GRANULES

[75] Inventors: Tetsuma Fujimoto, Neyagawa; Yuh Ohta, Kadoma; Michihiro Nakayama, Osaka; Haruo Uesugi, Higashiosaka, all of Japan

[73] Assignee: Fuji Paudal Kabushiki Kaisha, Osaka, Japan

[21] Appl. No.: 920,394

[22] Filed: Jul. 27, 1992

Related U.S. Application Data

[63] Continuation-in-part of Ser. No. 803,648, Dec. 4, 1991, abandoned.

[30] Foreign Application Priority Data

Dec. 17, 1990 [JP] Japan .................................. 2-411419

[51] Int. Cl.$^5$ ............................................. B29C 47/00
[52] U.S. Cl. ................................... 425/310; 264/142; 425/308; 425/461; 425/464; 425/DIG. 230
[58] Field of Search ................. 264/142; 425/310, 308, 425/461, DIG. 230, 464

[56] References Cited

U.S. PATENT DOCUMENTS

| | | | |
|---|---|---|---|
| 3,304,578 | 2/1967 | Clute . | |
| 3,337,913 | 8/1967 | List . | |
| 3,362,044 | 1/1968 | Irving | 425/310 |
| 3,688,544 | 9/1972 | Sagmuller et al. | 425/464 |
| 3,973,890 | 8/1976 | Porter et al. | 425/466 |
| 4,451,414 | 5/1984 | Rossiter | 264/142 |
| 4,465,447 | 8/1984 | Cheigh et al. | 425/DIG. 230 |
| 4,465,451 | 8/1984 | Adderley, Jr. | 264/142 |
| 4,496,298 | 1/1985 | Muench | 425/192 R |

FOREIGN PATENT DOCUMENTS 480611 7/1929 Fed. Rep. of Germany .
3617175A1 12/1986 Fed. Rep. of Germany .

OTHER PUBLICATIONS

Fuji Paudal Co., Ltd. "Advanced Engineering XTRUDER" brochure, pp. 1-7, Nov. 3, 1979.

*Primary Examiner*—David A. Simmons
*Assistant Examiner*—William J. Matney, Jr.
*Attorney, Agent, or Firm*—Shefte, Pinckney & Sawyer

[57] ABSTRACT

A screw-type front extrusion granulating apparatus for forming moistened powdered raw material such as chemicals for use in the agriculture, pharmaceutical, or food industries into granules, has a conveying screw in axial alignment with a semi-spherical die, the die having a plurality of die openings formed therein. The conveying screw has an extrusion blade mounted to its forward end to project into the confines of the semi-spherical die, the contour of the extrusion blade generally conforming to the inner surface of the die. In operation, the moistened powdered material is transported forwardly under pressure by the screw and extruded through the die utilizing the pressure of the screw and the scraping action of the extrusion blade.

27 Claims, 15 Drawing Sheets

PRIOR GRANULATOR PLANAR DIE

Prior Granulator
Radial Extrusion

SCREW-TYPE EXTRUSION GRANULATING APPARATUS, ESPECIALLY FOR PRODUCING VERY FINE GRANULES

CROSS-REFERENCE TO RELATED APPLICATION

This is a continuation-in-part of U.S. patent application Ser. No. 803,648, filed Dec. 4, 1991, entitled SCREW-TYPE EXTRUSION GRANULATING APPARATUS, now abandoned.

BACKGROUND OF THE INVENTION

The present invention relates broadly to extrusion granulators and more particularly to a screw-type extrusion granulating apparatus with a spherical die in axial alignment with the screw, which is especially suitable for efficiently producing granules of very small cross-sectional dimension.

Extrusion granulators are widely employed in the pharmaceutical, food, agricultural, chemical, and ceramic industries where moistened powdered raw materials such as chemicals, fertilizer, or feed stuffs to be formed into granules. Basic screw-type extrusion granulators utilize some form of rotating screw to transport the moistened powdered material to a die having holes formed therein. The pressure and scraping action of the screw forces the moistened powdered material through the holes in the die through which the material emerges in granulated form. "Front" type extrusion granulators have the die located in axial alignment with the conveying screw.

Conventional extrusion granulators of this type consist primarily of four main elements including a single or twin conveying screw arrangement driven by a motor, a screw housing in which the conveying screw is disposed, an extrusion blade or blades mounted to the front end of the conveying screw, and a flat die plate attached to the front end of the screw housing in axial alignment with the screw. In operation, powdered raw material previously moistened and plasticized by kneading machines is inserted into the screw housing from a feed hopper. The raw material is then forced to transfer forwardly to the front end of the screw housing by means of the conveying screw. During this process, the raw material is pressurized and compressed by the conveying screw and is extruded continuously through multiple die holes in the die plate.

Internal extruding pressure for extruding the raw material through the flat die plate has its maximum pressure in a uniform pressure region located just prior to the die plate. Therefore, the die thickness is selected to have sufficient strength to withstand the maximum extruding pressure. Typically, a smaller sized conventional extruder having a screw diameter in the range of 60 millimeters to 130 millimeters will have a die plate of a thickness of at least 5 millimeters, while larger extruders with screw diameters in the range of 180 millimeters to 300 millimeters have a die plate of at least 8 millimeters in thickness.

Extrusion granulators with flat die plates of this order of thickness achieve satisfactory production capacities when their die holes are relatively large so as to extrude correspondingly large granules. However, at a constant die thickness, as the die hole size is reduced to produce smaller sized granules, the production capacity of such extrusion granulators is reduced to unacceptably low levels and ultimately causes clogging of the die holes due to increased frictional drag imposed on the extrusion flow of material through the die holes. Generally, it has been found that a conventional flat die extruder having a die thickness of 5 to 8 millimeters can extrude raw material through a die hole diameter below 1.5 millimeters only with a very small production capacity which is normally far below acceptable industrial production rates.

This problem is becoming increasingly acute as smaller granule sizes are becoming increasingly required in various industries. For example, the pharmaceutical, agricultural-chemical, and catalyst industries are increasily demanding the ability to produce granules of less than 1.2 millimeters in diameter, often less than than 1.0 millimeter diameter, and even as small as 0.3 to 0.6 millimeter diameters. In the agricultural chemical industry, smaller herbicide granules, say in the range of about 0.7 to 1.2 millimeters can be distributed more uniformly than larger sized granules, enabling a lesser quantity of the smaller granules to achieve the same herbicidal effect as a greater quantity of larger granules, thereby reducing herbicide costs and minimizing any attendant environmental hazard. Likewise, in the pharmaceutical field, smaller sized granules improve drug availability and dispensability. In the catalyst industry, smaller granules provide increased surface area per unit weight, enabling equipment to be downsized and economy and efficiency of operation to be improved.

It has been proposed to reduce the die thickness to correspondingly reduce frictional drag and, in turn, achieve a higher production capacity. However, in tests employing a punched die plate having a punched die hole diameter of 1 millimeter with a die plate thickness of 1 millimeter and an opening ratio of 22.4%, although the production capacity of the granulator was significantly increased temporarily, the punched plate deformed outwardly after several minutes of operation, which led to a wider clearance between the punched plate and the extrusion blade, resulting in a lower production capacity and finally destruction of the punched plate. The primary cause of this result is that the relatively thin punched plate is not sufficiently strong to withstand the internal pressure generated within the screw housing.

In an effort to solve this problem, another type of extrusion granulator known as a screw-type radial extrusion granulator has been developed for production of smaller diameter extrudates in the range of 0.7 to 1.2 millimeters. In this type of granulator, an extracting screw is mounted to the conveying screw in a screw housing having a die holder which supports a generally semi-cylindrical punched plate laterally outwardly about the extracting screw. In this type of extrusion granulator, the raw material is first conveyed and compressed by the conveying screw axially within the screw housing and then is forced radially outwardly through the semi-cylindrical die by means of the extracting screw. A problem with this arrangement is that internal pressure generated by the conveying screw within the housing cannot be fully employed for the extrusion of the raw material through the die because the raw material is forced to change direction from a generally axial flow to a movement directed radially outwardly from the extracting screw, thus resulting in energy loss and inefficient production of granulate. Accordingly, the production capacity of this radial type extrusion granulator is far smaller than that of the front-type extrusion granulator.

SUMMARY OF THE INVENTION

It is accordingly an object of the present invention to provide a front-type screw extrusion granulating apparatus which solves the aforementioned problems. Specifically, it is an object of the present invention to provide such an extrusion granulating apparatus which is capable of producing reduced sized granulate in the range of less than 2.0 millimeters in diameter, especially relatively fine granulate of diameters less than 1.0 millimeter, in sufficient rates of production for efficient industrial applications.

According to the present invention, a screw-type extrusion granulating apparatus for extruding a moistened powder material into granules basically includes a housing defining a screw chamber for receiving the moistened powder material, a rotatably driven conveying screw disposed in the screw chamber for pressurizing conveyance of the moistened powder material through the screw chamber, and a die supported in axial alignment with the conveying screw. The die is of a generally uniform thickness preferably in the shape of a dome and has a plurality of extrusion openings formed therethrough in a generally uniform array over substantially the entire surface area thereof. The openings are oriented radially with respect to the dome shape of the die and are of a cross-sectional dimension approximately the same as the thickness of the die. The conveying screw has a terminal end adjacent the die in the shape of a dome spaced from the die and includes an extrusion blade projecting from the terminal end of the screw toward the die. The extrusion blade is curved in general correspondence to the die for directing the moistened powder material generally uniformly into and through the extrusion openings. The die may be mounted to a stiffening plate which, in turn, is mounted to the housing.

According to the preferred embodiment of the present invention, the extrusion blade is of a helical or spiral configuration and uniformly spaced from the die, e.g., at a distance of approximately 1 millimeter. Preferably, a plurality of the extrusion blades are disposed at spaced locations about the terminal end of the conveying screw. In one embodiment, a plurality of nip members protrude radially across and interiorly from the die toward the extrusion blade at spacings from one another for producing a nipping effect on the moistened powder material between the extrusion blade and the nip member during rotation of the conveying screw. Preferably, the die is semi-spherical in shape with the extrusion openings being generally circular in shape and of a diameter generally equal to the thickness of the die. The extrusion openings are selected to be of a size corresponding to the desired diameter of the granules to be produced from the moistened powder material. In the vast majority of embodiments of the present invention, the extrusion openings will be of a diameter less than about 2 millimeters, but the present invention is particularly advantageous and well suited for producing granules of diameters less than or equal to 1.2 millimeters, even as small as about 0.3 to 0.6 millimeters. In each case, the thickness of the die is within a range of approximately 0.8 to 1.5 times the diameter of the extrusion openings.

Preferably, the extrusion openings are arranged in a staggered relationship to one another to provide a generally uniform spacing between adjacent ones of the extrusion openings. For example, the extrusion openings may be arranged in a generally equilateral triangular relationship to one another. It is additionally preferred that the spacing, or pitch, between the centers of the extrusion openings is approximately twice the diameter thereof.

In the preferred embodiment, the die has a relatively large opening ratio measured as the total cross-sectional area of the extrusion openings in relation to the total surface area of the die, preferably in the range of between 10 and 25%, i.e., the extrusion openings occupy between 10 and 25 percent of the total surface area of the die.

The terminal end of the conveying screw may be oblate or spheroid to produce its dome shape. In either case, the geometric center of the dome shape of the die and the geometric center of the dome shape of the terminal end of the conveying screw may be relatively arranged to coincide or not coincide with one another. It is preferred that the die and the terminal end of the conveying screw be arranged to define therebetween an annular passage for flow of the moistened powder material with the passage being of gradually decreasing cross-sectional area taken radially from the geometric center of the terminal end of the conveying screw along successive radii in the direction outwardly from the conveying screw such that the cross-sectional area of the annular material passage at each radius is proportional to the cross-sectional area of the die outwardly thereof by a constant factor.

In one embodiment, the screw-type extrusion granulating apparatus includes two conveying screws disposed in side-by-side generally parallel relationship within the screw housing and the housing has two dies mounted thereto in side-by-side relationship with each die in axial alignment with a respective one of the conveying screws.

DESCRIPTION OF THE PREFERRED EMBODIMENT

Figure 1:
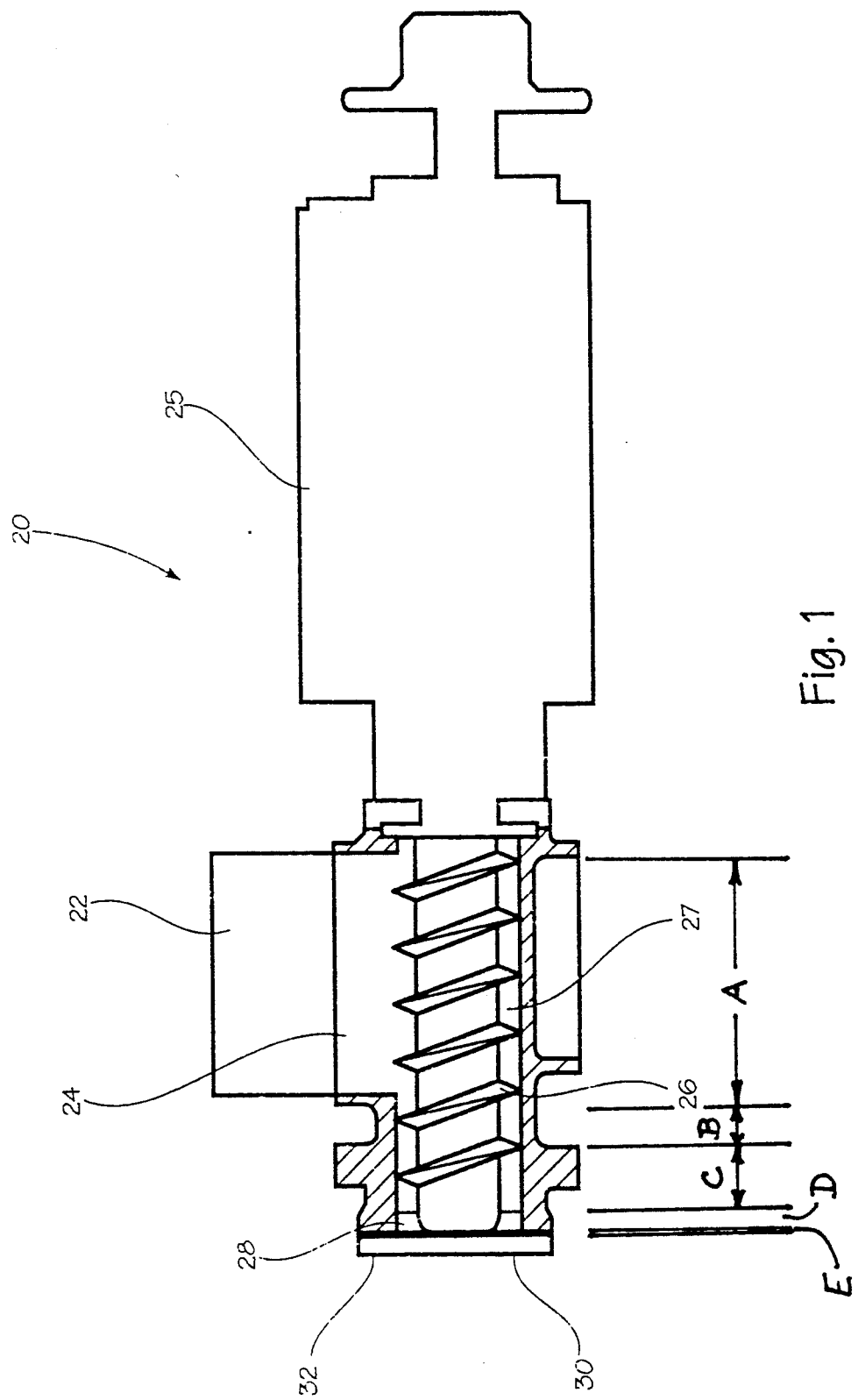
FIG. 1 is a schematic side elevational view, partially in vertical cross-section, of a conventional prior art screw-type front extrusion granulator having a planar die plate.

Referring now to the accompanying drawings and initially to FIGS. 1-4, FIG. 1 is a side elevational view, with portions cut away in cross section for purposes of clarity, of a prior art front extrusion granulator of the type having a planar die, generally indicated at 20. As is conventional, the granulator 20 includes an elongate extrusion housing 24, one end of which is mounted to a drive motor assembly 25. The extrusion housing 24 defines an internal screw chamber 27 rotatably containing a conveying screw 26 which is affixed to and driven by an output shaft (not shown) of the motor assembly 25. A planar die 30 is mounted to the forward end of the extrusion housing 24 in axial alignment with the conveying screw 26, i.e., in facing relation to the forward end of the screw 26 perpendicularly to its axis, by means of a die mounting plate 32 and conventional bolts. The die 30 is formed with a plurality of die openings spaced uniformly about its exposed surface area. An extrusion blade 28 is mounted to the forward end of the screw 26 closely adjacent the die 30.

As discussed above, such planar die extrusion granulators 20 are limited in production capacity due to inherent problems with the planar die 30. In operation, powdered raw material previously moistened and plasticized by kneading machines is charged into the extrusion housing 24 from a feed hopper 22 affixed to the extrusion housing 24 and opening downwardly into the rearward end of the screw chamber 27. The charged raw material is then forced to transfer forwardly to the front end of the extrusion housing 24 and the die 30 by rotational action of the conveying screw 26, which pressurizes and compresses the raw material to extrude the material outwardly through the openings in the die 30.

Figure 2:
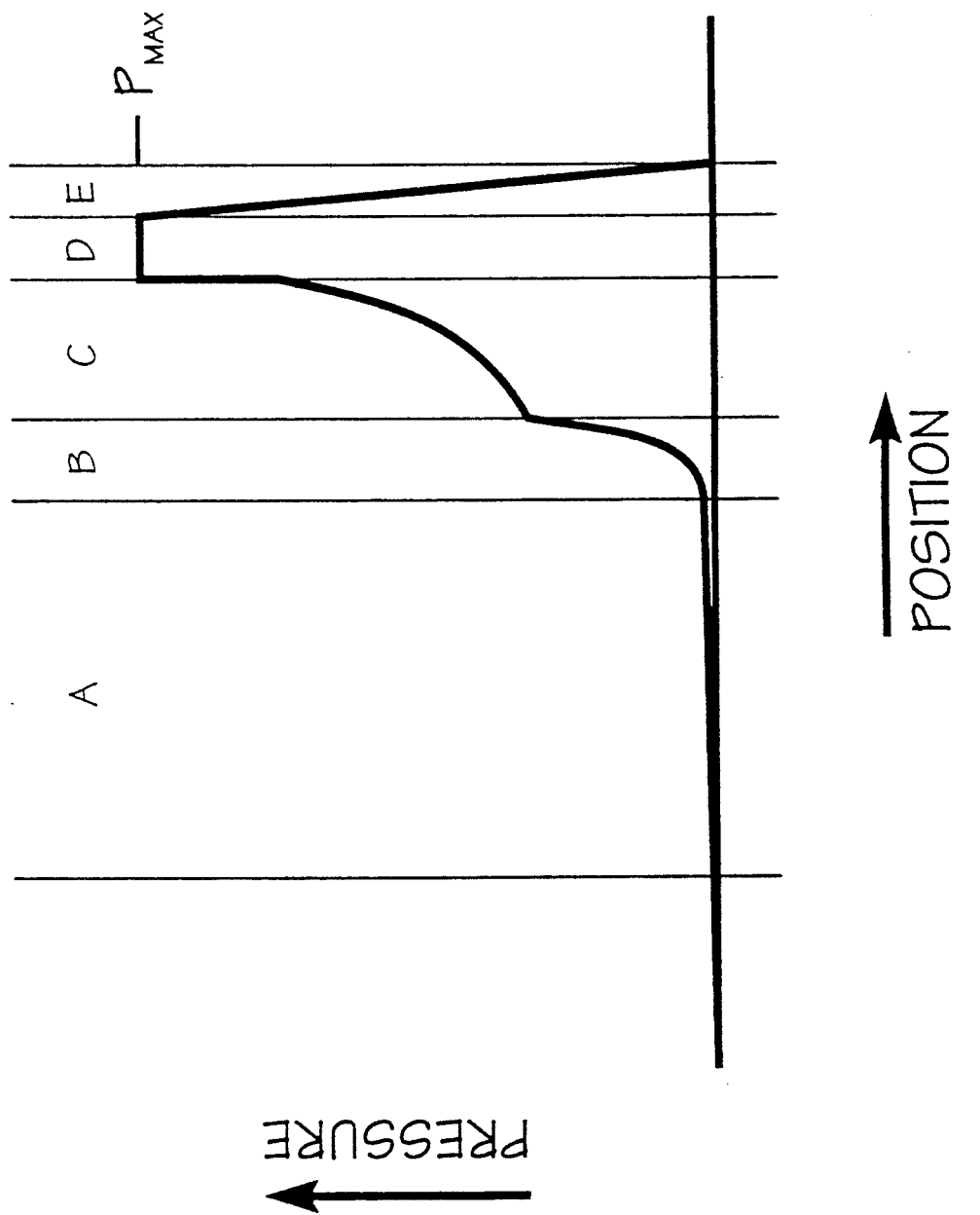
FIG. 2 is a graph representing the fluctuation of internal extrusion pressure according to the location of powder material during conveyance within the extrusion granulator of FIG. 1 in normal operation thereof.

With reference to FIGS. 1 and 2, internal extruding pressure within the extrusion housing 24 can be seen to rise throughout this process. It can be seen that in region A, representing the region of the screw chamber 27 communicating with the feed hopper 22, pressure is at a minimum, but rises rapidly as the material is conveyed beyond the feed hopper 22 to the front end of the screw 26, represented by the regions B and C. As the moistened raw material is conveyed to the extrusion blade 28 in the region D, maximum pressure is reached as the material is forced into the openings in the die. As the material passes through the die openings, the pressure drops from the maximum pressure level at the entrance end of the openings to ambient atmospheric pressure at the exit end of the openings, as represented at E. The die thickness must therefore be designed so as to have sufficient strength for resisting the maximum extruding pressure, $P_{max}$. As mentioned above, typical planar die plates in conventional extrusion granulators are of a thickness in the range of at least 5 to 8 millimeters. For the reasons explained below, die plates of these thicknesses perform unsatisfactorily when formed with smaller than conventional die holes sized to extrude relatively small granules in the range of 0.7 to 1.2 millimeters, for example.

Figure 3:
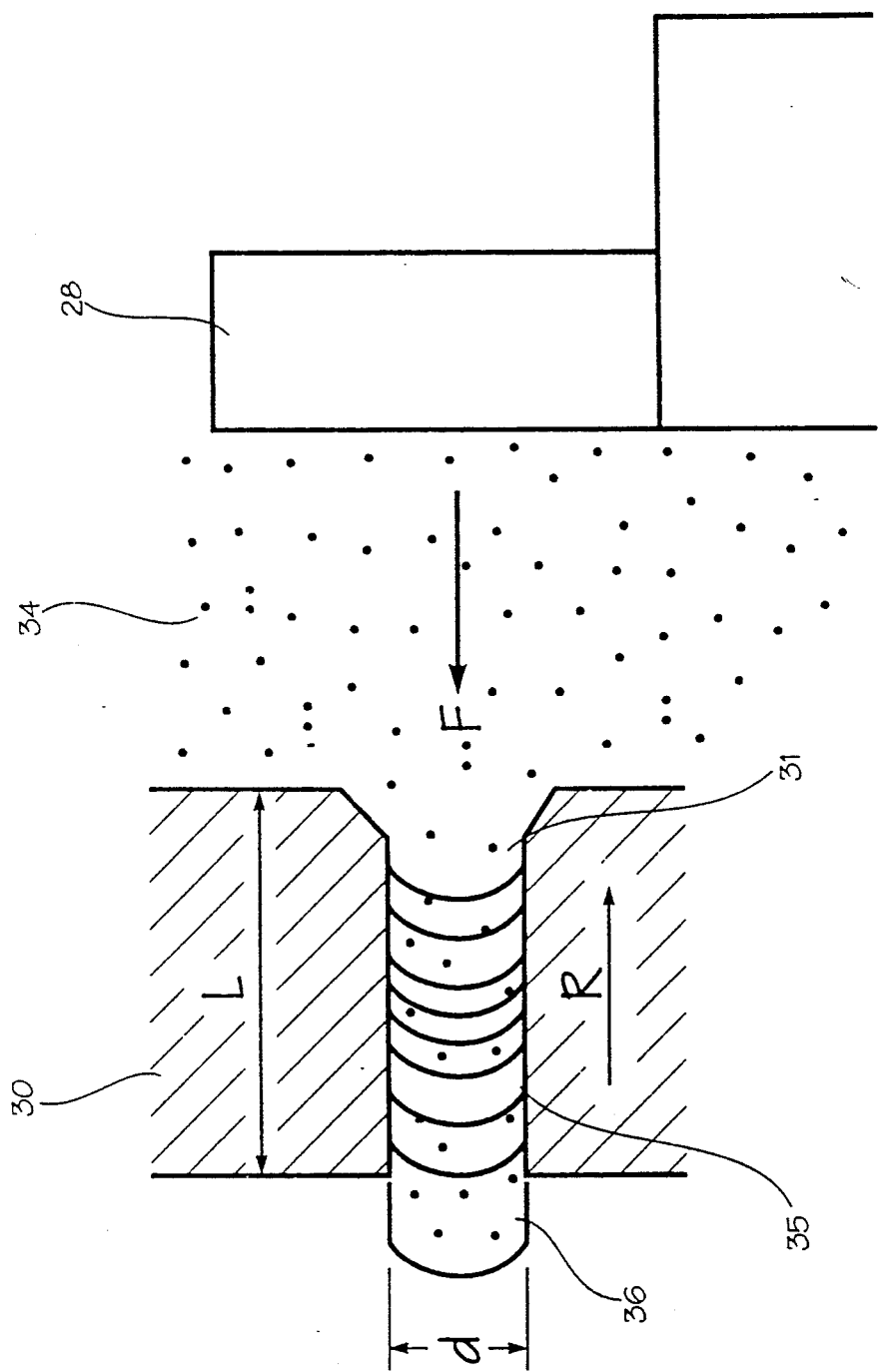
FIG. 3 is a schematic representation of the operational forces and variables which affect the production capacity of the extrusion granulator of FIG. 1 during normal operation thereof.

FIG. 3 offers a diagrammatic representation of the extrusion operation. The extruding force F applied to the moistened raw materials 34 at the die 30 should be greater than the drag force R created by the friction imposed on the material to be extruded moving along the die hole wall 35. Generally, at a constant die hole diameter d, the drag force R is proportional to the die hole length L, i.e., the thickness of the die 30. Therefore reducing the diameter d of the die opening while maintaining sufficient die thickness L to resist $P_{max}$ results in increasing the attendant drag force R which ultimately results in a lowered production capacity or even clogging of the die openings 31. Typically, conventional planar die extrusion granulators with a die thickness of 5-8 millimeters can extrude raw materials through a die hole diameter below 1.5 millimeters only at a very small production rate which is normally far below acceptable industrial levels.

Figure 4:
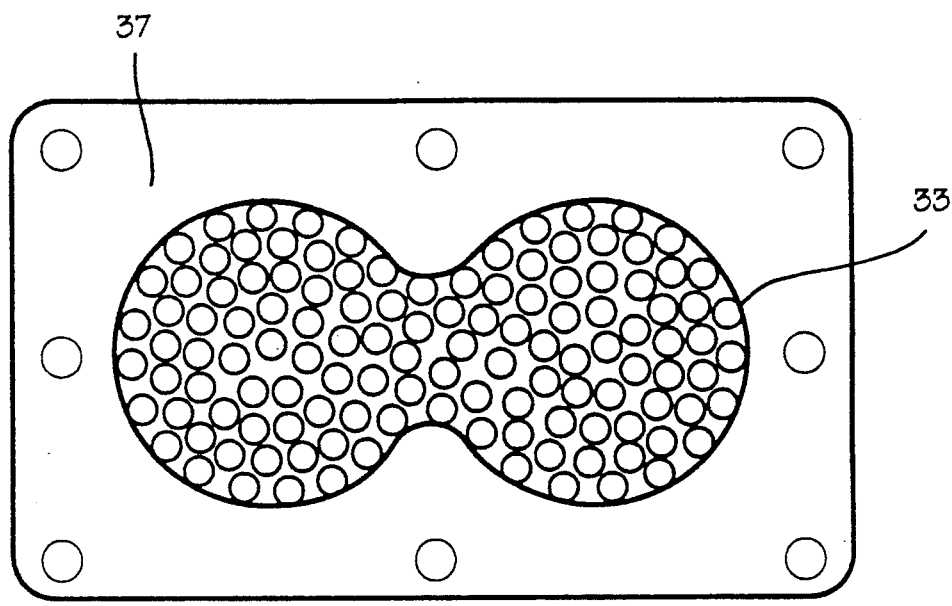
FIG. 4 is a front elevational view of the planar die and mounting plate of the prior granulating apparatus of FIG. 1.
Figure 4:
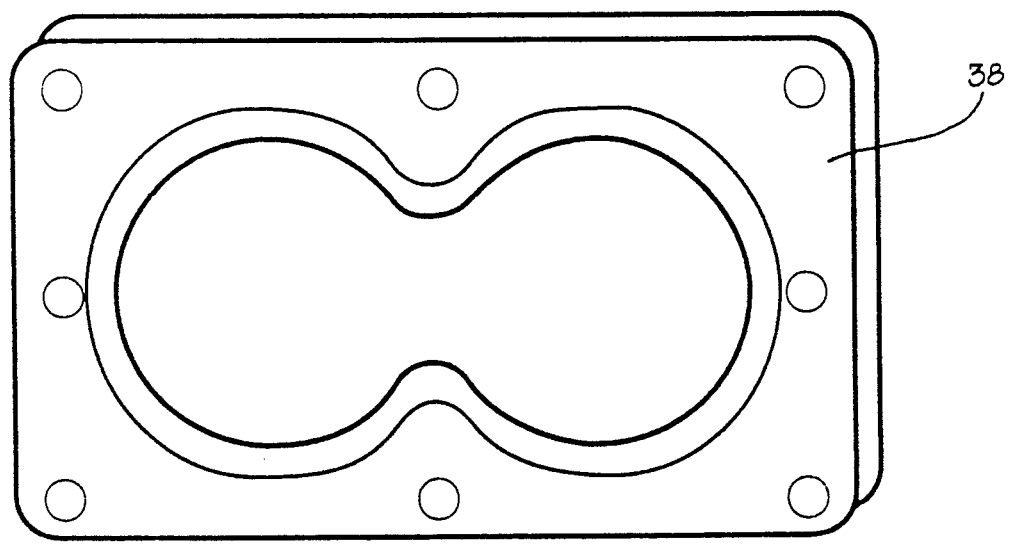

As shown in FIG. 4, it has been proposed to reduce the die thickness L by employing a flat die formed as a punched plate 37 of a 1.0 millimeter thickness with the punched die holes 33 being of a diameter of 1.0 millimeter, the die plate 37 to be held in place by a die holder 38 as discussed above. While tests of such a punched die plate temporarily achieved a considerably increased production capacity, the punched die plate was unable to withstand the extrusion pressure without deforming outwardly which led to a wider clearance between the punched plate and extrusion blade resulting in a lowered production rate and ultimate destruction of the punched plate.

Figure 5:
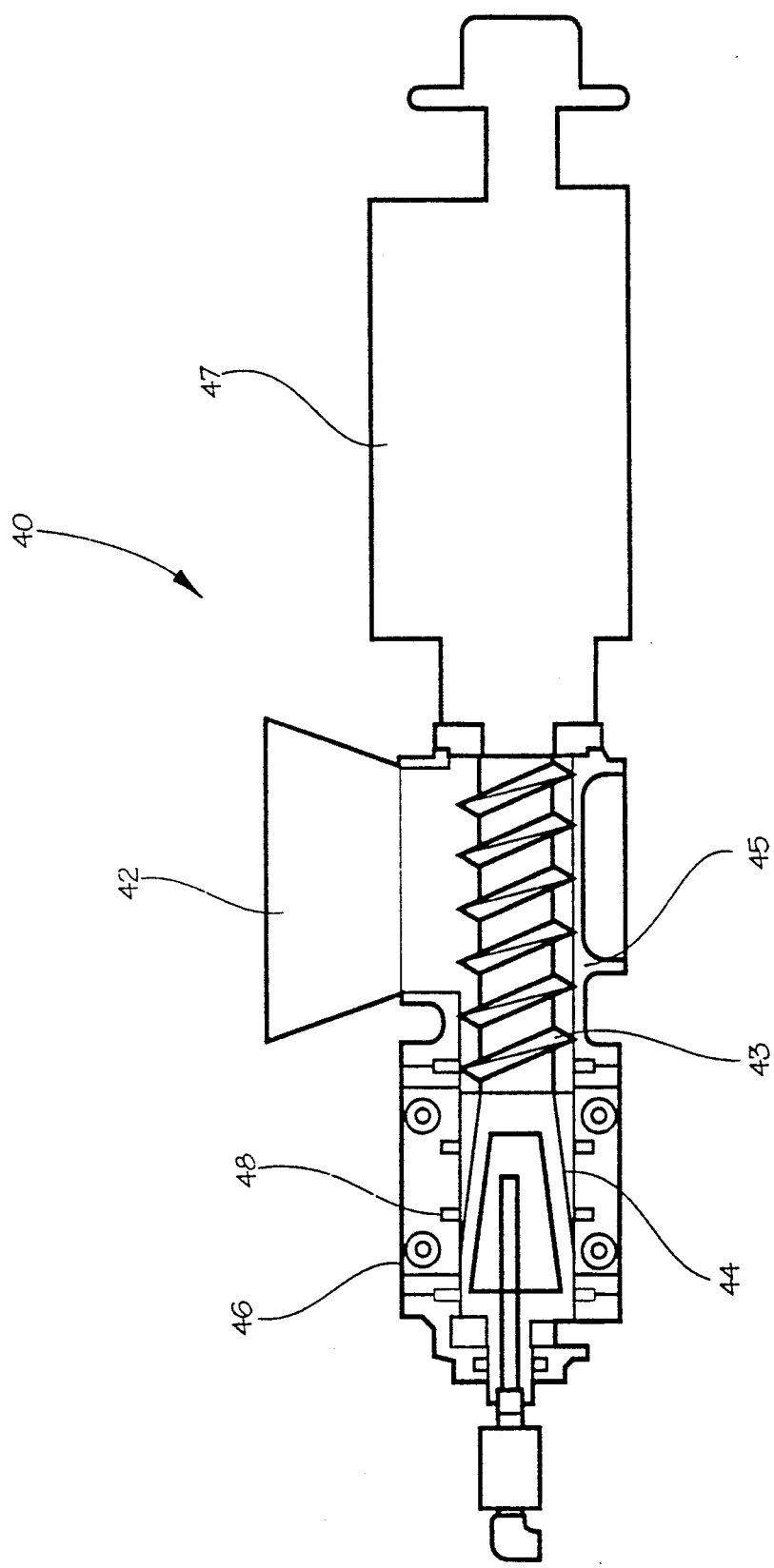
FIG. 5 is a schematic side elevational view, partially in vertical cross-section, of a conventional prior art screw-type radial extrusion granulator.
Figure 6:
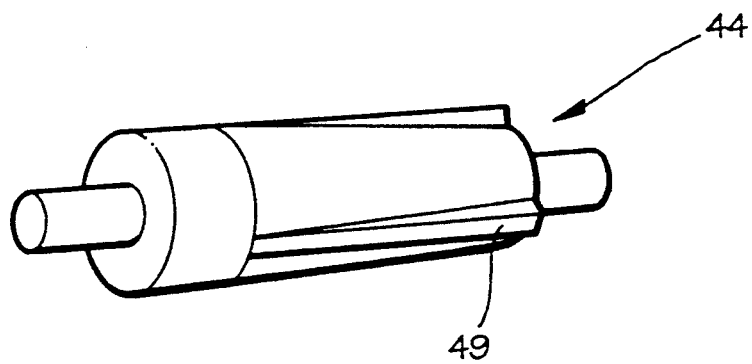
FIG. 6 is a perspective view of the extracting screw of the radial extrusion granulator of FIG. 5.
Figure 7:
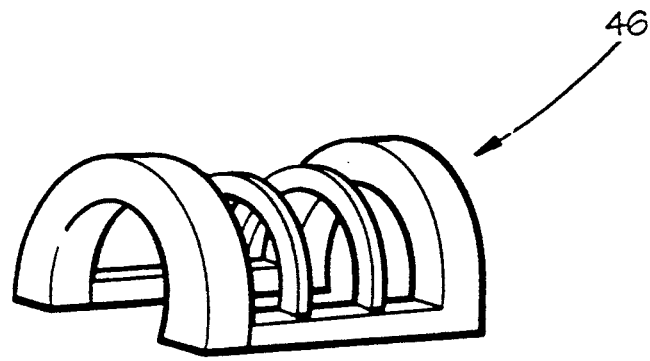
FIG. 7 is a perspective view of the die holder of the radial extrusion granulator of FIG. 5.
Figure 8:
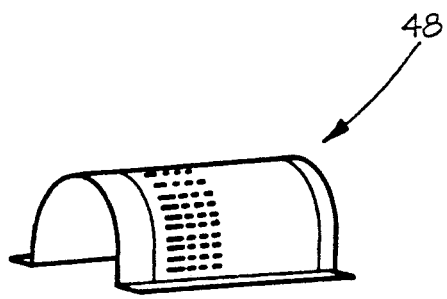
FIG. 8 is a perspective view of the semi-cylindrical die of the radial extrusion granulator of FIG. 5.

As also discussed above, these problems were alternatively addressed by the development of the radial-type extrusion granulator depicted generally at 40 in FIG. 5. This type of granulator is similar to the planar die front extrusion granulator in all aspects except for the extrusion mechanism. A conveying screw 43 is contained within a screw housing 45 which is in turn mounted to a drive motor housing 47. The rotational axis of the screw 43 is oriented horizontally and is fed from above by a feed hopper 42. An extracting screw 44 is mounted to the forward end of the conveying screw 43. As best seen in FIG. 6, the extracting screw 44 basically has a frusto-conical body with circumferentially-spaced axially-extending blades 49 projecting outwardly therefrom. A semi-cylindrical die 48, shown in FIG. 8, is supported within the confines of a semi-circular die holder frame 46 as seen in FIG. 7.

As seen in FIG. 5, the die and holder assembly 46,48 is mounted to the lateral side of the front portion of the screw housing 45, radially outwardly adjacent the extracting screw 44. In this type of extrusion granulator, moistened powder raw material is conveyed under pressure by the conveying screw 43 to the extracting screw 44 which drives the material laterally radially outwardly through the semi-cylindrical die 48. However, internal pressure generated by the conveying screw 43 cannot be fully employed for extrusion purposes because raw material pressurized by the screw 43 is forced to change direction from axial movement to radially outward movement by means of the extracting screw 44, whereby only a portion of the pressure generated by the conveying screw 43 can be utilized for extrusion purposes resulting in a less efficient and less productive granulation process than is experienced with front type granulators.

Figure 9:
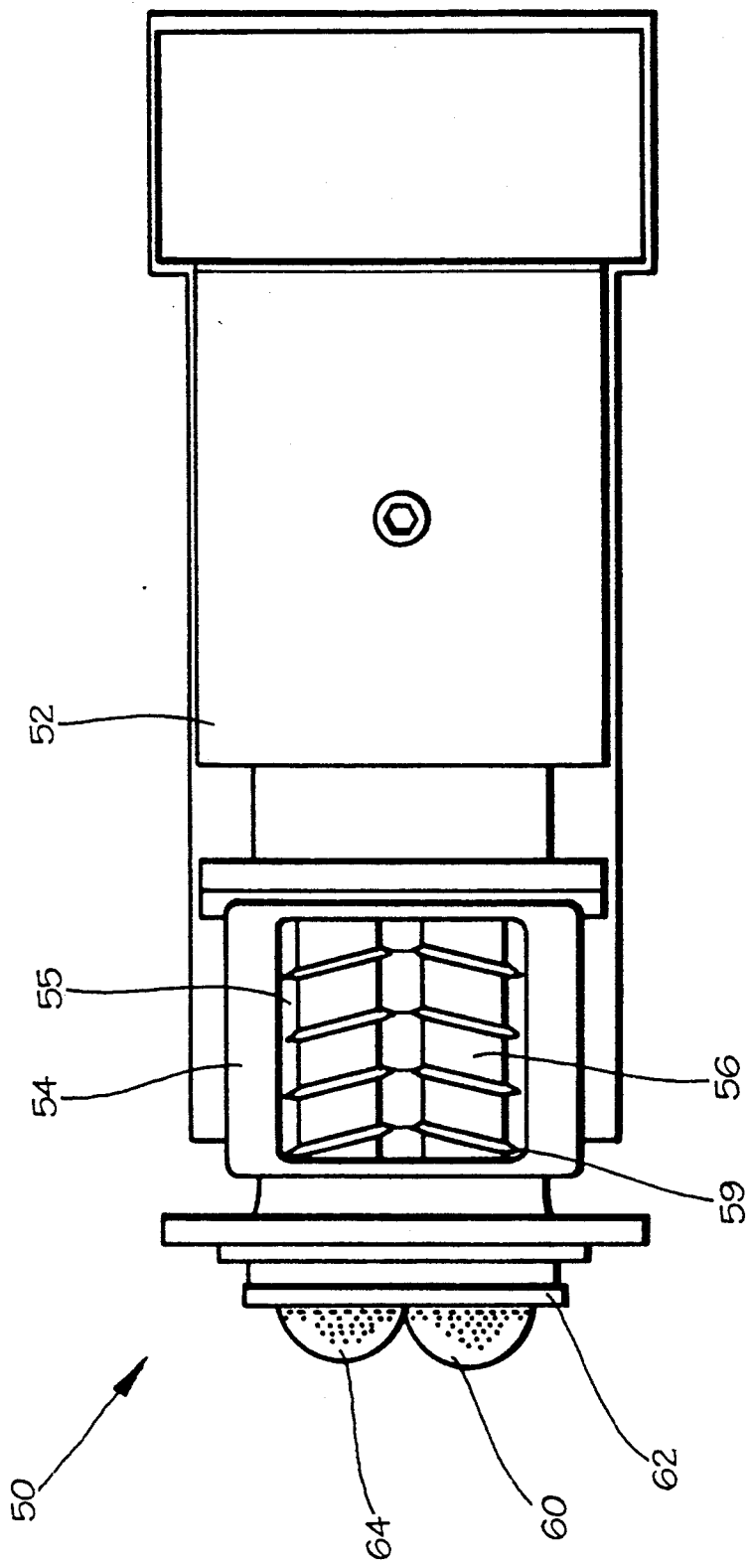
FIG. 9 is a top plan view of a screw-type extrusion granulating apparatus according to the preferred embodiment of the present invention.
Figure 10:
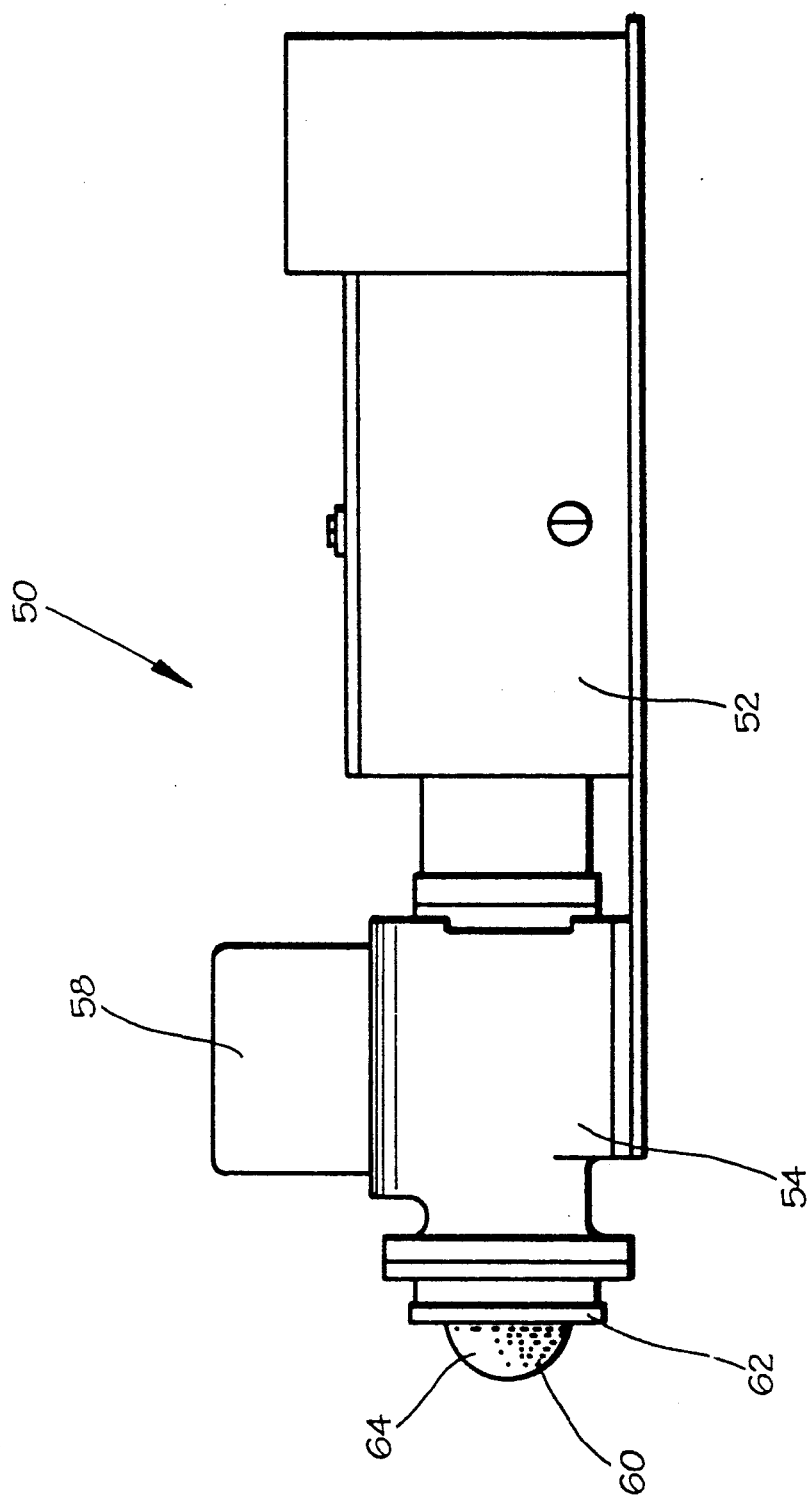
FIG. 10 is a side elevational view of the extrusion granulating apparatus illustrated in FIG. 9.

Turning now to FIGS. 9 and 10, one embodiment of a front-type screw extrusion granulating apparatus, constructed in accordance with the teachings of the present invention, is generally indicated at 50. The granulating apparatus 50 includes an extrusion housing 54 mounted to one end of a box-like housing 52 containing a drive motor assembly. The extrusion housing 54 defines an interior screw chamber 55 in which two conveying screws 56 are rotatably supported in side-by-side parallel relation for driving by the motor assembly. As seen in FIG. 10, a feed hopper 58 opens downwardly into the screw chamber 55 for feeding the moistened powder material en route to granulation. It should be understood that while the granulating apparatus 50 described herein is equipped with two parallel conveying screws 56, those persons skilled in the art will readily recognize that the present invention is equally applicable to a single screw extrusion granulator of similar construction.

Figure 11:
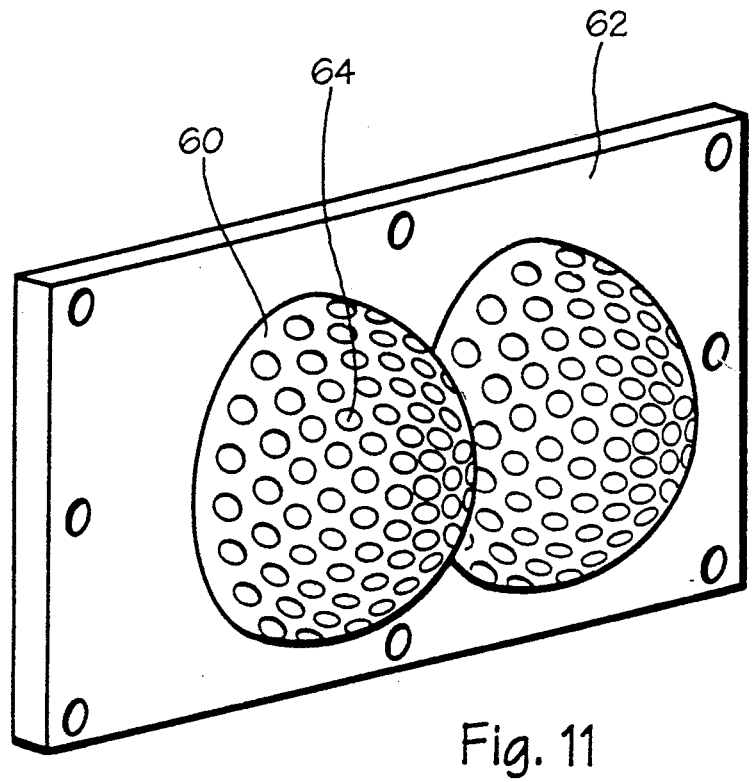
FIG. 11 is a perspective view of the die and its supporting stiffening plate of the extrusion granulating apparatus illustrated in FIG. 9.

According to the present invention, a die element 60 formed with a pair of dome-shaped die portions is mounted to the end of the extrusion housing 54 utilizing a stiffening plate 62 which is bolted or otherwise affixed to the extrusion housing 54. With reference to FIG. 11, the stiffening plate 62 is a generally rectangular planar plate having a plurality of bolt holes at its periphery for attachment to the extrusion housing 54 and formed in the central portion of the stiffening plate 62 with two openings through which the dome-shaped portions of the die 60 may protrude. The die 60 further includes a generally flat base portion laterally adjacent the dome-shaped portions which is typically welded or otherwise affixed to the inner surface of the stiffening plate 62. In mounted disposition of the stiffening plate and die element 62,60 to the extrusion housing 54, the stiffening plate openings and the dome-shaped portions of the die 60 are in axial alignment respectively with the conveying screws 56.

Preferably, the dome-shaped portions of the die 60 are of a semi-spherical configuration but dome-shaped configurations of other curvatures are also contemplated. For example, any die whose dome-shaped portion is a portion of a hollow spheroid, whether a circular spheroid, an oblate, or a prolate spheroid, or any other curved surface of a body of revolution, is contemplated to be within the scope of this invention.

Figure 11A:
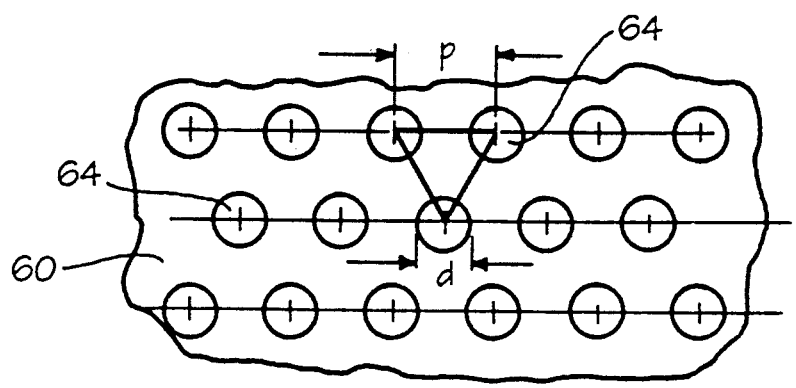
FIG. 11A is an enlarged front elevational view of a portion of the die of FIG. 11.

The die 60 is preferably formed as a relatively thin punched plate with each dome-shaped portion of the die 60 having multiple circular openings 64 formed therein and generally uniformly distributed over the entire domed surface in a geometrical order or in a zig-zag manner. For example, FIG. 11A illustrates one preferred arrangement of extrusion openings in a generally equilateral triangular relationship to one another wherein the pitch p between the openings, i.e., the spacing between the centers of adjacent openings, is approximately twice the diameter d thereof. The thickness of the die is preferably in range of about 0.8 to 1.5 times the diameter of the extrusion openings so that the diameter of the die holes 64 is generally about equivalent to the thickness of the die plate. The extrusion openings 64 are oriented to extended radially through the domed surface of the die 60 and are selected to be of a diameter substantially equivalent to the desired diameter of granules to be extruded. As more fully explained hereinafter, the granulating apparatus of the present invention is particularly advantageous for extruding granules of less than 2 millimeters in diameter, especially granules of less than 1.0 to 1.2 millimeters in diameter and even granules as small as 0.3 to 0.6 millimeters in diameter, when the extrusion openings are formed of a commensurate diametric dimension.

These parameters for the dimensioning and arrangement of the extrusion openings 64 provide the die 60 with a relatively high opening ratio, measured as the total cross-sectional area of the extrusion openings 64 in relationship to the total surface area of the die 60, preferably in the range of about 10 and 25 percent of the total surface area of the die when the extrusion openings are in the aforementioned range of diameters. More specifically, the opening ratio of hemispherical dies according to the present invention may be expressed as a percentage of the total hemispherical surface area of the die and calculated by the following formula:

$$F = 0.907 \left(\frac{d}{p}\right)^2 \times 100(\%)$$

wherein F represents the opening ratio percentage, d is the diameter of the circular extrusion openings, and p is the pitch of the circular extrusion openings. Thus, for a hemispherical die of a diameter of 106 millimeters, the following chart provides representative examples of differing die embodiments having extrusion openings formed of respectively differing diameters and pitches:

| Die Hole Diameter (d)(mm) | Die Thickness (mm) | Hole Pitch (p)(mm) | Opening Ratio (F)(%) | Number of Extrusion Openings |
|---|---|---|---|---|
| 1 | 1.0 | 2.0 | 22.7 | 5100 |
| 0.8 | 0.8 | 1.7 | 20.1 | 7060 |
| 0.6 | 0.6 | 1.3 | 19.3 | 12050 |

As those persons skilled in the art will understand, the present invention is not restricted for formation of the die 60 from a punched plate but, instead, the die 60 may be formed of any suitable material and in any suitable manner by which perforated dome-shaped portions of a substantially uniform thickness can be produced. For example, the die 60 may be fabricated as a spherically press-formed blind plate with the die holes being subsequently formed by a drilling or laser cutting operation or, alternatively, the dome-shaped die portions may be fabricated of a screen mesh material formed into a semi-spherical or other dome-like shape.

Figure 12:
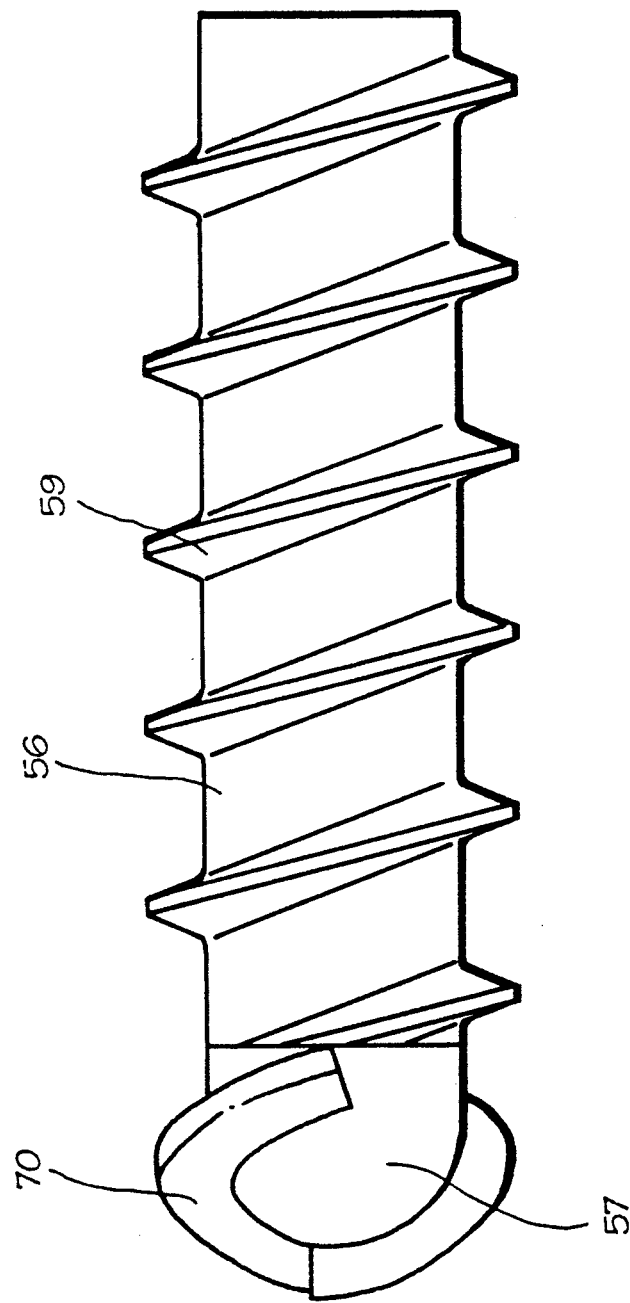
FIG. 12 is a side elevational view of one conveying screw and extrusion blade from the extrusion granulating apparatus illustrated in FIG. 9.
Figure 13:
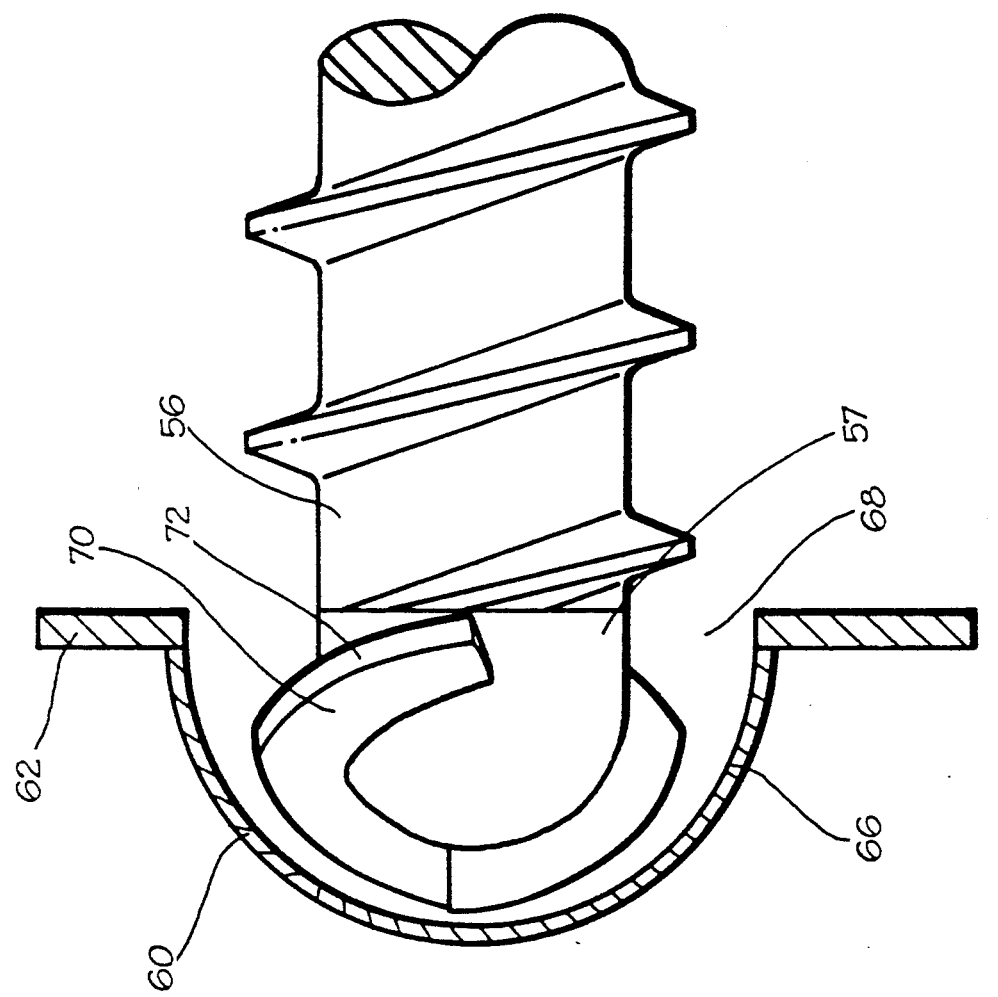
FIG. 13 is a side elevational view, partially in vertical cross-section, of the front end portion of one conveying screw and its extrusion blade and the die of the extrusion granulating apparatus of FIG. 9.
Figure 14:
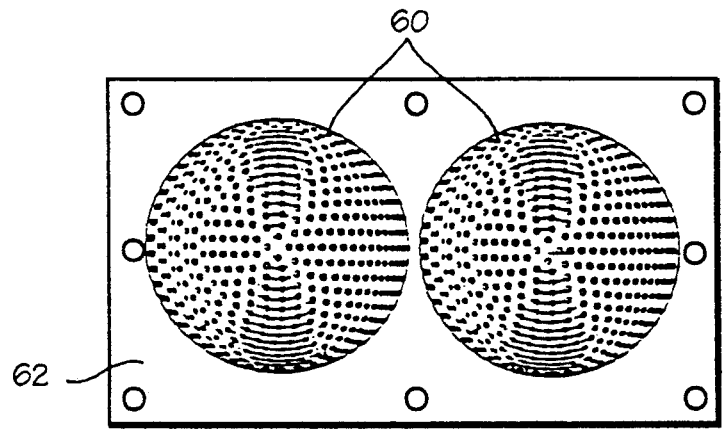
FIG. 14 is a front elevational view of another embodiment of die and stiffening plate for use in the extrusion granulating apparatus of FIG. 9
Figure 15:
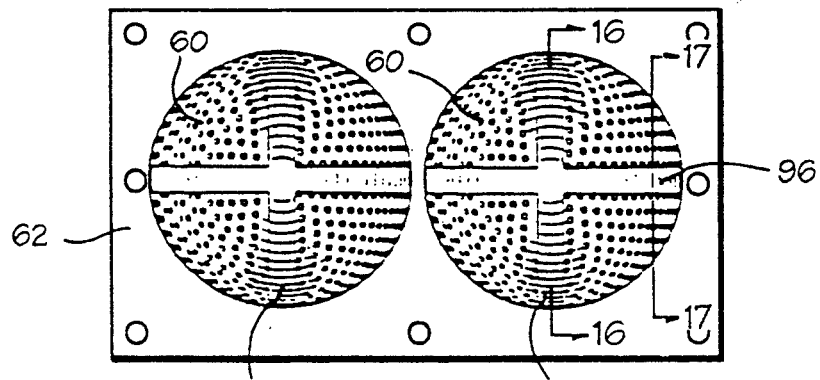
FIG. 15 is a rear elevational view of the die and stiffening plate of FIG. 14.

As best seen in FIG. 12, each conveying screw 56 has an elongated generally cylindrical root portion having a blade 59 projecting outwardly from the surface thereof in a helical configuration substantially the entire length of the root portion. A domed terminal end portion 57 is formed at the forward end of each conveying screw 56 and includes at least one, preferably plural, helically curved extrusion blades 70 extending outwardly therefrom at spacings thereabout. The curvature of the outermost edge of the curved extrusion blade 70 is in conformity to the curvature of the dome-shaped portion of the die 60. As best seen in FIG. 13, the outward edge 72 of each spherical extrusion blade 70 extends into the confines of its respectively associated dome-shaped die portion in substantially concentric relation therewith at a relatively constant spacing from the inner surface 66 of the dome-shaped die portion.

Figure 18:
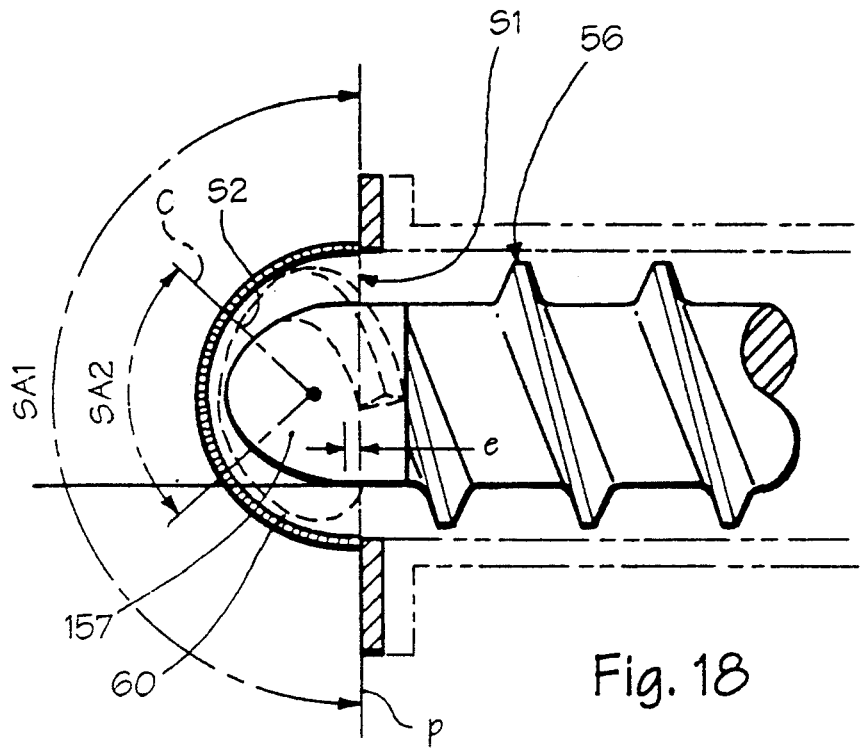
FIG. 18 is a partially side elevational and partially vertical cross-sectional view similar to FIG. 13, showing the die of the extrusion granulating apparatus of FIG. 9 in combination with a conveying screw and its extrusion blade according to another embodiment thereof.

The curvature of the domed terminal end portion 57 of the conveying screw 56, on the other hand, may or may not conform to the dome-shaped curvature of the die 60. The dome-shaped terminal end portion may be semi-spherical in shape, as represented by the terminal end portion 57 in the embodiment of FIG. 13 and the terminal end portion 157 in the embodiment of FIG. 18 or, alternatively, may be of another three-dimensional curving geometric shape such as oblate as represented by the terminal end portion 257 of FIG. 19, and in either case, the geometric center of the terminal end portion may coincide with or be located eccentrically from the geometric center of the dome-shaped die 60. For example, in the embodiment of FIG. 13, the semi-spherical terminal end portion 57 is concentric with the semi-spherical die 60, whereby the annular material passage defined between the terminal end portion 57 and the die 60 is of a uniform cross-sectional dimension measured along any radius. In contrast, the semi-spherical terminal end portion 157 of the conveying screw 56 in FIG. 18 is arranged eccentrically with respect to the die 60 by a spacing small e between their respective centers, whereby the annular material passage defined between the terminal end portion 157 and the die 60 is of a gradually decreasing cross-sectional area taken radially from the geometric center of the terminal end portion 157 along successive radii in the direction outwardly from the conveying screw 56. The same effect is achieved by the oblate terminal end portion 257 of the conveying screw 56 in FIG. 19.

Figure 18A:
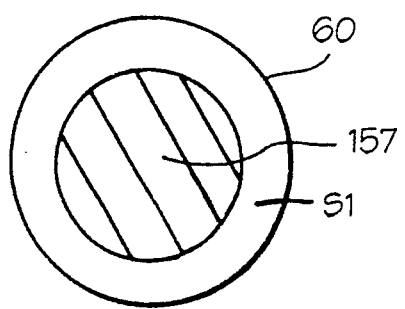
FIG. 18A is a cross-sectional view of the apparatus of FIG. 18 taken along plane P thereof.
Figure 18B:
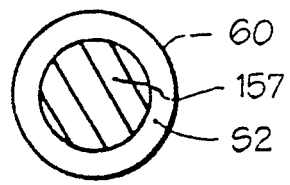
FIG. 18B is a cross-sectional view of the apparatus of FIG. 18 taken along con C thereof.
Figure 19:
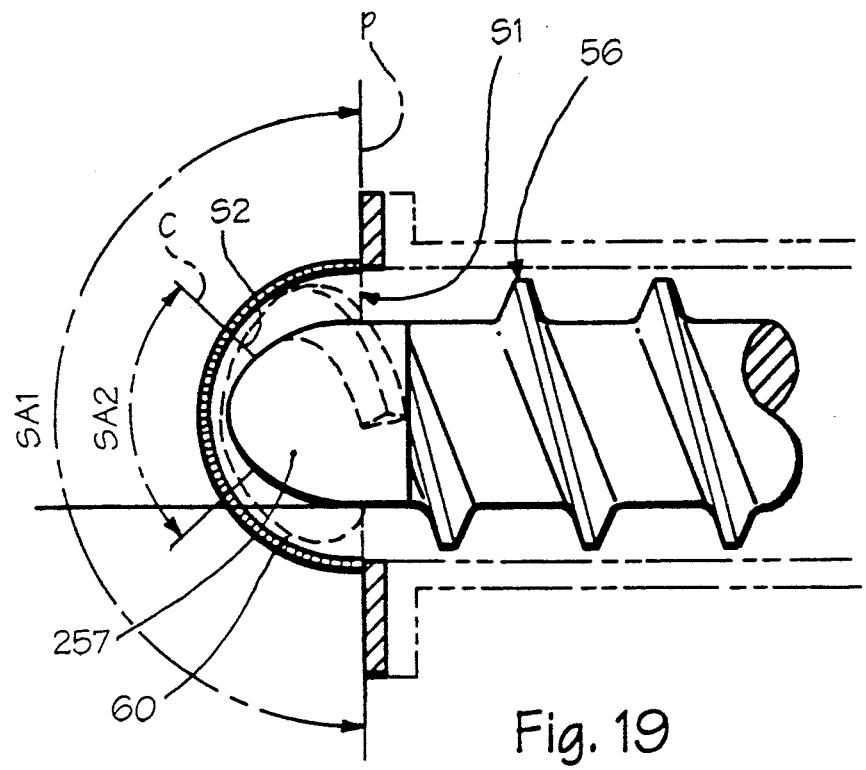
FIG. 19 is a further partially side elevational and partially vertical cross-sectional view similar to FIGS. 13 and 18, showing the die of the extrusion granulating apparatus of FIG. 9 in combination with a further embodiment of conveying screw and extrusion blade.
Figure 19A:
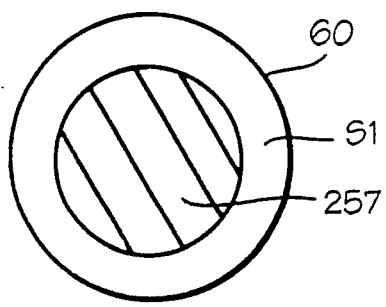
FIG. 19A is a cross-sectional view of the apparatus of FIG. 19 taken along plane P thereof.
Figure 19B:
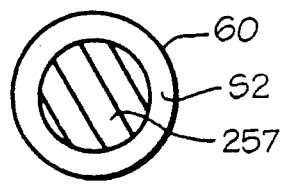
FIG. 19B is a cross-sectional view of the apparatus of FIG. 19 taken along cone C thereof.

In the case of each of the embodiments of FIGS. 18 and 19, the shape, size, and arrangement of the domed end portion 157,257 is selected so that the cross-sectional area of the annular material passage between the end portion and the die 60 at each radius of the end portion is proportional to the surface area of the die outwardly thereof away from the conveying screw by a constant factor. Specifically, as depicted by way of example in FIG. 18, a cross-sectional plane P taken diametrically through the terminal end portion 157 in perpendicular relation to the axis of the conveying screw 56 includes an annular cross-section of the material passage between the terminal end portion 157 and the die 60, indicating at S1 in FIG. 18A, the cross-sectional area of which is proportional to the total surface area of the die 60 outwardly thereof (i.e., away from the conveying screw 56), indicated by $SA_1$ in FIG. 18, by a multiplication factor K. Similarly, a cone C projecting outwardly from the geometric center of the terminal end portion 157 co-axially with the axis of the conveying screw 56 includes an annular cross-section of the material passage between the terminal end portion 157 and the die 60, depicted by S2 in FIG. 18B, whose cross-sectional area is proportional to the total surface area $SA_2$ encompassed within the cone C by the same multiplication factor K. The same relationship exists between the radially-measured cross-sectional area of the material passage and the outward surface area of the die encompassed therewithin at every other radius of the terminal end portion 157.

The oblate terminal end portion 257 in the embodiment of FIG. 19 produces the same relationship between the annular cross-sectional area of its material passage and the outward surface area of the die at any annular cross-section taken radially with respect to the terminal end portion 257. Thus, the annular cross-sectional area S1 of the material passage is proportional to the total outward cross-sectional area $SA_1$ and the annular cross-sectional area S2 of the material passage is likewise proportional to the encompassed surface area $SA_2$ of the die by a common multiplication factor.

In operation, powdered raw material, moistened and plasticized by pre-treatment by a kneading machine, is charged into the extrusion housing 54 through the feed hopper 58. The charge material is compressed, densified, and pressurized as the material is forced toward the forward end of the screw chamber 55 and the die 60 by means of the rotation of the conveying screws 56. When the material reaches the spacing between the forward ends 57 of the conveying screws 56 and the interior surface 66 of the dome-shaped portions of the die 60, the material is forcibly extruded continuously through the die openings 64 by the combination of a scraping effect on the material layered over the interior die surface 66 created by the helically-shaped extrusion blade 70 and pressure created by the conveying screws 56. Advantageously, in embodiments such as exemplified in FIGS. 18 and 19 wherein the cross-section of the material passage between the terminal end portion of the conveying screw and die gradually reduces in the direction away from the conveying screw, the balance between inflowing material within the material flow passage and outflowing material being extruded through the extrusion openings is maintained substantially uniform over essentially the entire surface area of the die, which in turn serves to optimize the granule production capacity of the apparatus and also contribute to the smoothness of its running of its running operation.

An advantage of fabricating the die from a perforated flat thin plate formed into a dome-shaped die is to provide significantly increased die strength which enables the use of a thin punched plate as a die material. Initial experimental tests have indicated that a dome-shaped die according to the present invention can withstand an internal extrusion pressure within the screw housing of up to twelve times greater than a flat die plate of the same thickness. In addition the dome-shaped die surface increases the effective opening ratio of the die holes up to three times that of flat die plates. As a collective result, dome-shaped dies according to this invention experience reduced frictional forces and achieve considerably increased production capacity, especially in extruding smaller sized granules, e.g., in the range of 1.2 millimeters and less, and can efficiently extrude very fine granules in the range of 0.3 to 0.6 millimeters which is difficult or even impossible using conventional extrusion granulators. In turn, dies according to the present invention should have a considerably longer effective life. Further, the extruding force is substantially uniformly distributed over the entire interior surface of the die. This effect is obtained by a combination of propulsive pressure due to the conveying screw and the rubbing or scraping effect of the extrusion blade on the material in the region between the outward edge of the rotating extrusion blade and the internal die surface which contributes to uniform and improved extrusion performance and increased production capacity.

For purposes of comparison, a die formed according to the present invention as a relatively thin punched plate with semi-spherical dome-like die portions was tested against a flat die plate of conventional thickness, as well as a flat die plate formed of a relatively thin punched plate by performing separate extrusion operations in which each die was installed on a conventional screw-type front extrusion granulator and a common moistened powder raw material was processed through the granulator. As an additional basis of comparison, a corresponding extrusion operation was performed on a conventional screw-type radial extrusion granulator of comparable construction equipped with a semi-cylindrical die of the type described above. The front extrusion granulator utilized in the tests was a Model EXDF-100 manufactured by Fuji Paudal Co., Ltd. of Osaka, Japan, the assignee hereof, while the radial extrusion granulator was a Model EXD-100 also produced by Fuji Paudal Co., Ltd. In each case, each granulator was equipped with a conveying screw having a 100 millimeter diameter and with a 3.7 kilowatt motor driving the screw at a constant speed. The raw material processed in each case was a mixture of 70% talc powder and 30% bentonite powder, by weight, with a quantity of 17% water, based upon the dry weight of the powdered materials, being added as moistening agent. The spherically-shaped die according to the present invention had a 1 millimeter thickness and was formed with a sufficient number of uniformly-spaced die holes each of a 1 millimeter diameter to provide the die with a 22.4% opening ratio. Correspondingly, the conventional flat die was of a typical 5 millimeter thickness with a sufficient number of uniformly-spaced die holes of 1 millimeter diameter to produce the same 22.4% opening ratio. The flat punched plate die was of a 1 millimeter thickness with 1 millimeter diameter die holes producing a corresponding 22.4% opening ratio. The semi-cylindrical die utilized in the radial extrusion granulator was of a 1 millimeter punched plate formed with 1 millimeter diameter die holes at a 22.4% opening ratio. In testing of the semi-spherical die according to the present invention, the conveying screw was equipped with a dome-shaped forward end having a spherically shaped extrusion blade projecting outwardly therefrom, while the conveying screw utilized in testing each flat die plate was equipped with twin flat blades at its forward end of the conventional type depicted in FIGS. 1 and 3. The conveying screw and the tested radial extrusion granulator had an extracting screw affixed at its forward end, of the conventional type depicted in FIG. 5.

In operation of the front extrusion granulator fitted with the 5 millimeter thickness flat die plate, a production capacity of about 150 kilograms of granules per hour was achieved by operation of the drive motor at an amperage between 15 and 18. While no deformation of the die plate occurred, the operation of the granulator was unstable and clogging of the die openings was observed. The front granulator when fitted with the flat 1 millimeter thickness punched die plate achieved a production rate of about 1,200 kilograms of granules per hour when operating the drive motor at 15 amperes before deformation and breakage of the die occurred shortly after operation began. The radial extrusion granulator achieved a production capacity of about 520 kilograms per hour at the same 15 amperage motor operation and ran stably on a continuous basis without die deformation, although the granulator tended to pulsate in operation. By contrast, the front extrusion granulator when equipped with the semi-spherical die of the present invention and operated at a motor amperage of 15 achieved a production capacity of about 1,950 kilograms per hour and ran stably on a continuous basis without die deformation and without any pulsation of the extrusion action.

Similar comparative tests were performed using the same three granulators, but in this case each granulator was equipped with a 5.5 kilowatt drive motor for the conveying screw and the respective dies were of a 0.4 millimeter thickness and formed with extrusion openings of a 0.3 millimeter diameter in sufficient number to provide a 13 percent opening ratio. In operation of the granulator equipped with a dome-shaped die according to the present invention, the granulator was observed to run smoothly on a continuing basis without operational problems and achieved a production rate of about 400 kilograms of granules per hour. In contrast, the flat die in the conventional front extrusion granulator failed due to deformation thereof very shortly after operation commenced, without achieving any acceptable production of granules. The radial extrusion granulator operated for approximately ten minutes, achieving an effective production capacity of about 80 kilograms of granules per hour, before deformation of the die caused operational failure.

Figure 20:
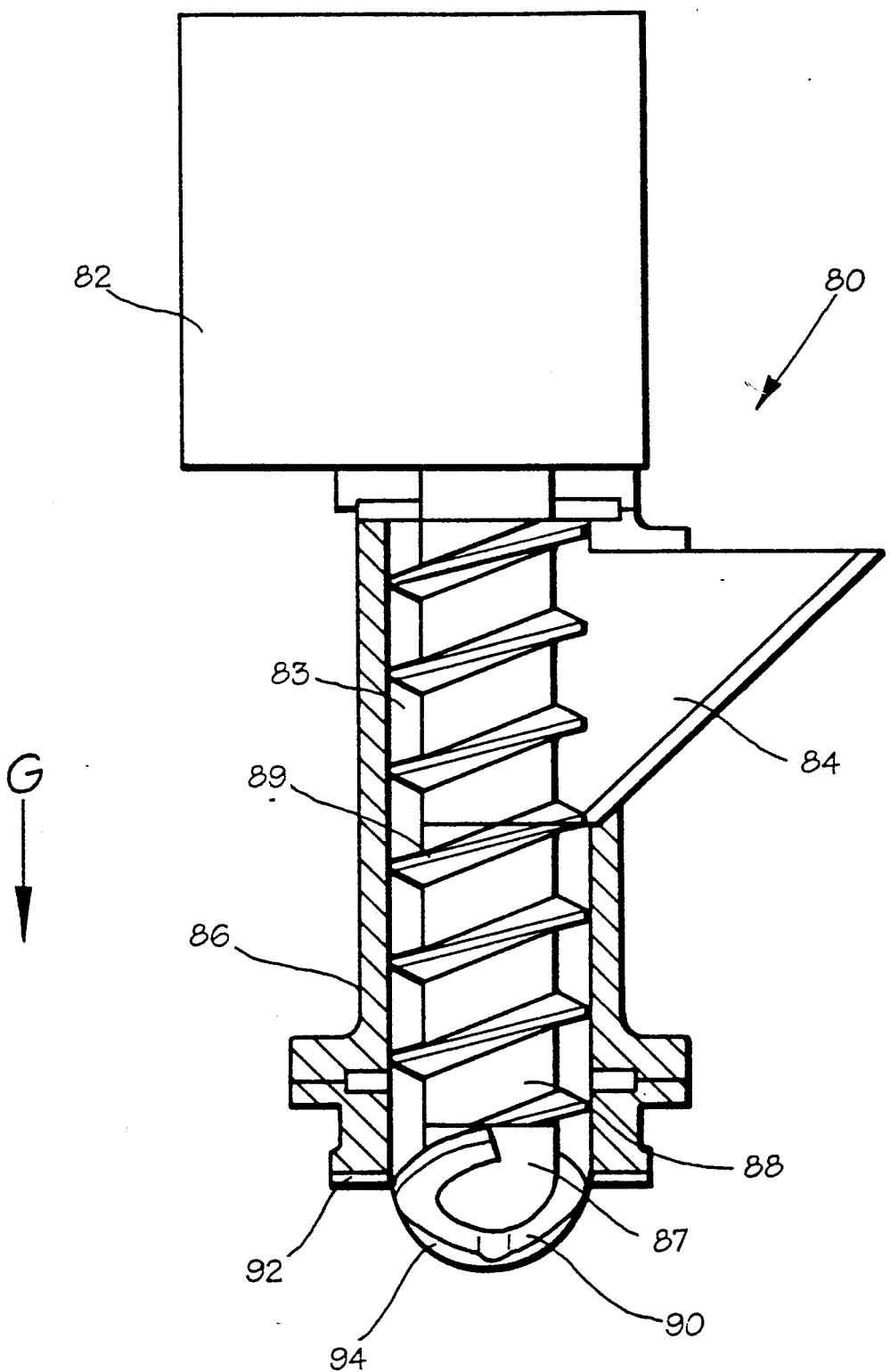
FIG. 20 is side elevational view, partially in vertical cross-section, of a vertically disposed screw extrusion granulating apparatus according to an alternate embodiment of the present invention.

In addition to the generally horizontal orientation illustrated by the preferred embodiment of the present invention, it is also possible to apply this invention to a vertical type screw extrusion granulating apparatus as shown generally at 80 in FIG. 20. The vertical extrusion granulating apparatus 80 includes a motor housing 82 vertically oriented with its output drive facing downwardly and with an elongate screw housing 86 extending downwardly from the motor housing 82. A triangularly shaped feed hopper 84 is mounted to the screw housing 86 to feed raw material thereinto. A conveying screw 88 is drivenly affixed to the motor 82 and extends downwardly through the screw housing 86 for rotation therewithin. The conveying screw 88 is of substantially the same construction as the conveying screws 56 of the extrusion granulator 50 of FIGS. 9-13, a having a helical blade 89 extending the length of the root portion of the screw 88 and having an extrusion blade 90 affixed to the outer surface of the downward "front" end 87 of the screw 88. A die 94 with a perforated semi-spherical or otherwise dome-shaped die portion is mounted to a stiffening plate 92 which is in turn mounted to the screw housing 86 within the dome-shaped portion in axial alignment with the screw 88. As with the embodiment of FIGS. 9-13, the extrusion blade 90 is helical in shape with its outer edge conforming generally to the semi-spherical or dome shape of the inner surface of the die 94. The operation of this embodiment of the present invention is basically the same as for the preferred embodiment of the present invention, except that the extrusion effect produced by the scraping effect of the blade 90 and the pressure generated by the screw 88 are somewhat aided by gravity G.

Figure 16:
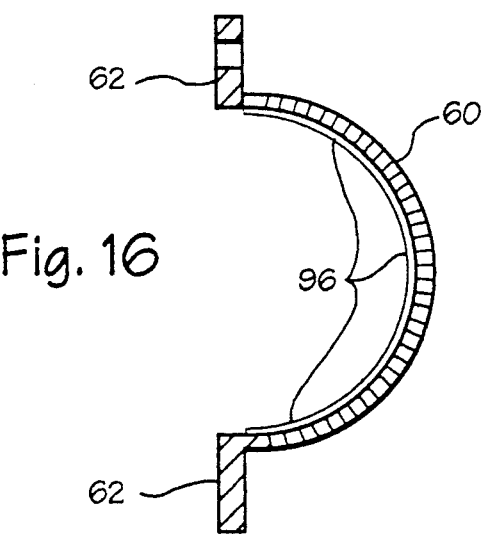
FIG. 16 is a vertical cross-sectional view of the die and stiffening plate of FIGS. 14 and 15, taken along line 16—16 thereof.
Figure 17:
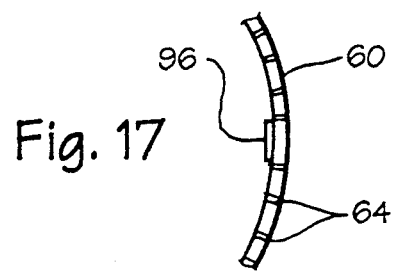
FIG. 17 is another vertical cross-sectional view of the die of FIGS. 14 and 15, taken along line 17—17 thereof.

Referring now to FIGS. 14-17, an alternate embodiment of a semi-spherical dome-shaped die according to the present invention is illustrated, wherein the concave interior surface of each dome is provided with a pair of diametrically-extending and perpendicularly-intersecting nip bars 96 which protrude radially inwardly within the concave interior of each dome to a slight extent, as best seen in FIGS. 16 and 17. By way of example, the widthwise dimension of each nip bar 96 may be on the order of about 3 millimeters in its thickness and in turn the dimension of its radially inward protrusion may be on the order of about 0.4 millimeters. In operation, by virtue of the closer spacing of the nip bars 96 to the outward edge 72 of the extrusion blade 70, the interaction of the extrusion blades 72 during rotation of the conveying screw 56 with respect to the stationery nip bars 96 produces a nipping effect on the moistened powder material within the material passage, which enhances the scraping effect achieved by the extrusion blade 72 on the moistened powder material on the interior surface 66 of the die 60. In addition, the nip bars 96 serve to prevent any tendency of the moistened powder material from slipping on the interior die surface 66 while also preventing any tendency of the powder material to stick to the extrusion blades 72.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A screw-type extrusion granulating apparatus for extruding a moistened powder material into granules, said apparatus comprising a housing defining a screw chamber for receiving said moistened material, a rotatably driven conveying screw disposed in said screw chamber for pressurizing conveyance of said moistened powder material through said screw chamber, and a die supported in axial alignment with said conveying screw and extending axially from one end of said screw chamber, said die being of a generally uniform thickness in the shape of a dome and having a plurality of extrusion openings of substantially uniform size and shape formed therethrough in a generally uniform array over substantially the entire surface area thereof, said extrusion openings being oriented radially with respect to the dome shape of said die and being of a cross-sectional dimension approximately the same as the thickness of said die, said conveying screw having a terminal end extending axially interiorly of said die in the shape of a dome spaced from said die and an extrusion blade having a blade edge, said extrusion blade projecting from said dome-shaped terminal end toward said die to terminate at said blade edge and said blade edge being curved in general correspondence to said die and being at a substantially uniform radial spacing from said dome-shaped terminal end, said extrusion blade applying a nipping action to said moistened powder material between said dome-shaped terminal end and said die to thereby facilitate movement of said moistened powder material generally uniformly into and through said extrusion openings to emerge therefrom as granules.

2. A screw-type extrusion granulating apparatus according to claim 1 wherein said die is mounted to a stiffening plate and said stiffening plate is mounted to said housing.

3. A screw-type extrusion granulating apparatus according to claim 1 wherein said extrusion blade is uniformly spaced from said die.

4. A screw-type extrusion granulating apparatus according to claim 3 wherein said spacing between said extrusion blade and said die is approximately 1 millimeter.

5. A screw-type extrusion granulating apparatus according to claim 3 wherein said extrusion blade is helical in shape.

6. A screw-type extrusion granulating apparatus according to claim 5 wherein a plurality of said extrusion blades are disposed at spaced locations about said terminal end of said conveying screw.

7. A screw-type extrusion granulating apparatus according to claim 3 wherein a nip member protrudes radially across and interiorly from said die toward said extrusion blade for producing a nipping effect on said moistened powder material between said extrusion blade and said nip member during rotation of said conveying screw.

8. A screw-type extrusion granulating apparatus according to claim 7 wherein a plurality of said radial nip members are disposed at spacings from one another over the interior surface of said die facing said extrusion blade.

9. A screw-type extrusion granulating apparatus according to claim 1 wherein said die is generally semi-spherical.

10. A screw-type extrusion granulating apparatus according to claim 1 wherein said extrusion openings are generally circular in shape for forming generally cylindrical granules and are of a diameter generally equal to the thickness of said die.

11. A screw-type extrusion granulating apparatus according to claim 10 wherein said extrusion openings are of a diameter of less than about two millimeters (2 mm).

12. A screw-type extrusion granulating apparatus according to claim 11 wherein said extrusion openings are of a diameter in the range of about 0.3 to 0.6 millimeters.

13. A screw-type extrusion granulating apparatus according to claim 11 wherein said extrusion openings are of a diameter in the range of about 0.7 to 1.2 millimeters.

14. A screw-type extrusion granulating apparatus according to claims 11, 12, or 13 wherein the thickness of said die is within a range of approximately 0.8 and 1.5 times the diameter of said extrusion openings.

15. A screw-type extrusion granulating apparatus according to claim 10 wherein the thickness of said die is within a range of approximately 0.8 and 1.5 times the diameter of said extrusion openings.

16. A screw-type extrusion granulating apparatus according to claim 1 wherein said extrusion openings are arranged in a staggered relationship to one another to provide a generally uniform spacing between adjacent ones of said extrusion openings.

17. A screw-type extrusion granulating apparatus according to claim 16 wherein said extrusion openings are arranged in a generally equilateral triangular relationship to one another.

18. A screw-type extrusion granulating apparatus according to claim 16 wherein said extrusion openings are generally circular in shape and the spacing between the centers of said extrusion openings is approximately twice the diameter thereof.

19. A screw-type extrusion granulating apparatus according to claim 1 wherein said extrusion openings occupy in excess of about 10 percent (10%) of the total surface area of said die.

20. A screw-type extrusion granulating apparatus according to claim 19 wherein said extrusion openings are generally circular in shape and their total cross-sectional area occupies between about 10 percent (10%) and 25 percent (25%) of the total surface area of said die.

21. A screw-type extrusion granulating apparatus according to claim 1 wherein the geometric center of the dome shape of said die and the geometric center of the dome shape of said terminal end of said conveying screw coincide with one another.

22. A screw-type extrusion granulating apparatus according to claim 1 wherein the geometric center of the dome shape of said die and the geometric center of the dome shape of said terminal end of said conveying screw do not coincide with one another.

23. A screw-type extrusion granulating apparatus according to claim 1 wherein said die and said terminal end of said conveying screw define therebetween an annular passage for flow of said powder, said passage being of gradually decreasing cross-sectional area taken radially from the geometric center of said terminal end of said conveying screw along successive radii in the direction outwardly away from said conveying screw.

24. A screw-type extrusion granulating apparatus according to claim 23 wherein said cross-sectional area of said annular material passage at each radius of said terminal end of said conveying screw is proportional to the surface area of said die outwardly thereof away from said conveying screw by a constant factor.

25. A screw-type extrusion granulating apparatus according to claim 1 wherein said terminal end of said conveying screw is oblate.

26. A screw-type extrusion granulating apparatus according to claim 1 wherein said terminal end of said conveying screw is spherical.

27. A screw-type extrusion granulating apparatus according to claim wherein said screw chamber contains a plurality of conveying screws disposed in side-by-side, generally parallel relationship and said housing has a plurality of dies mounted thereto and disposed in side-by-side relationship, each said die being in axial alignment with a respective one of said conveying screws.

* * * * *

UNITED STATES PATENT AND TRADEMARK OFFICE
CERTIFICATE OF CORRECTION

PATENT NO. : 5,240,400

DATED : August 31, 1993

INVENTOR(S) : Tetsuma Fujimoto et al.

It is certified that error appears in the above-identified patent and that said Letters Patent is hereby corrected as shown below:

Column 1, line 23, after "stuffs" insert -- are --.

Column 2, line 15, delete "than".

Column 5, line 17, after "9" insert -- ; --.

Column 5, line 34, delete "con" and insert therefor -- cone --.

Column 5, line 44, after "is" insert -- a --.

Column 8, line 30, after "in" insert -- the --.

Column 8, line 34, delete "extended" and insert therefor -- extend --.

Column 9, line 62, delete "small".

Column 10, line 41, after "passage" insert -- and --.

Column 11, lines 1-2, delete "contribute" and insert therefor -- contributes --.

Column 11, line 2, delete "of its running" (second occurrence).

Column 13, line 7, delete "a" (first occurrence).

Column 13, line 40, delete "stationery" and insert therefor -- stationary --.

Column 16, line 38, after "claim" insert -- 1 --.

Signed and Sealed this

Ninth Day of August, 1994

Attest:

BRUCE LEHMAN

*Attesting Officer*    *Commissioner of Patents and Trademarks*